(12) United States Patent
Rugg et al.

(10) Patent No.: US 6,517,649 B1
(45) Date of Patent: Feb. 11, 2003

(54) PROCESS FOR CONTROLLING VACUUM FORMING

(75) Inventors: Paul J. Rugg, Kentwood, MI (US); Chad R. Haskin, Marne, MI (US); Laurie A. Weeks, Traverse City, MI (US); Marlin D. Broersma, Byron Center, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 0 days.

(21) Appl. No.: 09/672,365

(22) Filed: Sep. 28, 2000

(51) Int. Cl.$^7$ .............................................. B32B 31/00
(52) U.S. Cl. ..................... 156/64; 156/286; 156/358; 156/359
(58) Field of Search .................... 156/64, 351, 382, 156/84, 212, 213, 285, 286, 359, 358; 264/701; 425/143

(56) References Cited

U.S. PATENT DOCUMENTS

| | | | |
|---|---|---|---|
| 2,781,078 A | | 2/1957 | Dovidio |
| 3,149,018 A | | 9/1964 | Jacobson |
| 3,726,953 A | * | 4/1973 | Jones ........................ 264/89 |
| 4,872,826 A | * | 10/1989 | Padovani .................. 425/388 |
| 5,472,660 A | * | 12/1995 | Fortin ....................... 264/522 |
| 5,578,158 A | * | 11/1996 | Gutowski .................. 156/285 |
| 5,759,325 A | * | 6/1998 | Davis ....................... 156/154 |
| 5,792,291 A | * | 8/1998 | Ormachea .................. 156/64 |
| 5,910,280 A | * | 6/1999 | Deason ...................... 264/296 |

FOREIGN PATENT DOCUMENTS

| | | |
|---|---|---|
| EP | 0063462 A | 10/1982 |
| FR | 844127 A | 7/1939 |
| FR | 2669572 | 5/1999 |
| JP | 2000015693 A | 1/2000 |

* cited by examiner

*Primary Examiner*—Richard Crispino
*Assistant Examiner*—George R. Koch, III
(74) *Attorney, Agent, or Firm*—Warner Norcross & Judd LLP

(57) ABSTRACT

A vacuum wrapping process and apparatus for adhering a flexible material to a rigid substrate. The temperature of the flexible material is monitored, processed, and controlled by a control unit. The material is supported over the substrate in a mold. Spring-loaded rotatable bars are supported within the mold and compress the marginal portion of the material against the mold. A vacuum draws the material toward the substrate, and the bars control the release of the material at a desired rate. The vacuum drawn on the material is monitored, processed and controlled by the control unit. The amount of vacuum applied to the material is inversely related to the temperature of the material. The control unit alters parameters of the vacuum molding process, such as the material temperature and the vacuum to reduce tearing, stretching, and/or wrinkling of the material. The spring-loaded bars control the rate at which the material is drawn toward the substrate under the vacuum, thus further reducing tearing, stretching, and/or wrinkling.

64 Claims, 12 Drawing Sheets

PROCESS FOR CONTROLLING VACUUM FORMING

BACKGROUND OF THE INVENTION

The present invention relates to a method of bonding a material to a substrate, and more particularly to adhering a flexible material to a rigid substrate using a vacuum forming process.

Vacuum wrapping is a well known art that has become important in many industries. For example, vacuum wrapping is used to produce automotive parts such as interior door panels and instrument panels. Conventional vacuum wrapping processes include three basic steps: (a) heating a sheet of fabric to make the sheet more pliable; (b) transferring the sheet to a vacuum mold; and (c) vacuum molding the sheet over an adhesive-coated substrate so that the fabric adheres to the substrate to form a completed article.

In the heating step, the sheet is placed in a heating module, suspended above and/or below conventional heating elements by a frame that captures the edges of the sheet. The sheet is heated to a temperature and for a time sufficient to render it pliable.

Next, the sheet is transferred in the frame from the heating module to a vacuum mold. With reference to FIG. 1, the sheet 10 is disposed in the mold between platen mold 58 and contoured mold 56, held in frame 11 by clamps 16 and 18 over the substrate 20. The mold includes vacuum ports 44, through which a vacuum source 40 may draw a vacuum. As illustrated in FIG. 2, the mold 50 is closed. The sheet 10 is adhered to the upper contours of the substrate 20 by the adhesive 2 as the sheet is lowered. FIG. 3 depicts the sheet 10 after it has conformed to a majority of the substrate surfaces, excluding recesses 36 and 38. With the mold closed, the clamps 16 and 18 open to release the sheet 10; however, the sheet does not move because its edges remain pinched between platen 58 and contoured mold 56.

In FIG. 3, a vacuum is drawn through vacuum holes 44 and substrate holes 22 to draw the sheet 10 into conformity with the substrate 20. With reference to FIG. 4, the vacuum has drawn the sheet 10 into conformity with the substrate 20, particularly recess 36.

Although the prior art vacuum wrapping process effectively adheres a sheet to a substrate, it suffers a number of shortcomings. First, during the application of the vacuum, the sheet is stretched as it conforms around the edge of the substrate. In some cases, the sheet is torn. Both stretching and tearing and ripping defects are unacceptable. Moreover, it is typically impossible to vacuum wrap thinner, more fragile sheets with the prior art process because such sheets are very prone to tearing.

Second, the high vacuum pulls the sheet into the recesses so rapidly that in some instances the sheet stretches, crinkles, and/or rolls over on itself to form wrinkles in the sheet. FIG. 4 depicts such wrinkles 13. This defect also is unacceptable.

Third, excessively heated sheets become prone to tearing when subjected to a vacuum. Unfortunately, the only way an operator can determine if a sheet has been excessively heated, and thus subject to tearing during vacuum application, is by trial and error. For example, a first sheet torn too easily indicates to the operator that the heat applied to the next sheet must be reduced before vacuum wrapping, or the amount of vacuum used to draw the next sheet must be reduced. If neither of these actions is taken, the next sheet will similarly tear. This trial and error process wastes material and valuable manufacturing time.

Fourth, the prior art vacuum wrapping process requires large margins along the edges of the sheet so that the sheet may be gripped between the platen and the contoured mold before the application of high vacuum. These large margins increase scrap generation.

SUMMARY OF THE INVENTION

The aforementioned problems are overcome by the present invention wherein the draw of a sheet by a vacuum is controlled and further wherein a control system senses and controls parameters of temperature and vacuum applied to a sheet to prevent deformation.

In a first aspect of the invention, the free edges of the sheet are controllably released as the sheet is vacuum wrapped into contoured recesses under a vacuum to prevent stretching, and tearing and wrinkling. More specifically, the vacuum mold includes a clamping device operated by a spring or other hydraulic assist mechanism that contacts the margin of the sheet and frictionally retains the sheet against a surface of the mold. The preferred clamping device is a spring-loaded rotatable bar. The spring pushes the bar down against a portion of the sheet, clamping the sheet against the mold. Thus, when the mold is closed, in addition to being held by conventional pinching of the sheet between mold halves, the sheet is also held by friction between the clamping device and the mold.

Accordingly, when the mold halves are opened, and a vacuum is applied to draw the sheet into the contoured recesses of the substrate, the clamping device keeps the sheet in close contact against the mold to prevent reduction of the vacuum and additionally, prevents the sheet from being rapidly pulled into the recesses. Thus, the sheet is drawn into recesses in a slow, controlled manner. Advantageously, this controlled draw reduces stretching and wrinkling of sheets of conventional thickness. Moreover, thinner, more fragile materials may be vacuum molded without tearing.

In an alternative embodiment of this aspect of the invention, the controlled release clamping devices are hydraulically operated and include independent position sensors that act in concert with pressure sensors on the mold. The sensors monitor the draw of the sheet by the vacuum and send this information to a processing unit. The processing unit then alters the clamping force exerted on the sheet by the clamping device or the vacuum to more accurately control the draw of the sheet. Advantageously, this approach prevents unnecessary stretching of the sheet and reduces the time necessary to draw the sheet onto the substrate.

In a second aspect of the present invention, a multi-staged or variable vacuum is used to selectively draw the sheet toward the substrate. The vacuum may be selectively increased or decreased to create a non-constant vacuum profile to further reduce stretching.

In a third aspect of the invention, the temperature of the sheet and the vacuum drawn on the sheet are monitored and controlled to prevent unnecessary tearing of holes in the sheet. It has been discovered that the temperature of a thermoplastic sheet is inversely related to the vacuum that may be drawn on that sheet without unintentionally creating a hole. Thus, sheets heated to a relatively high temperature should be drawn into contours of a substrate with a lower vacuum than sheets that are heated to a relatively low temperature.

In accordance with the above discovery, the present inventive process selectively monitors with sensors parameters such as the temperature of a formable sheet and the pressure of the vacuum used to draw the sheet onto a substrate. The temperature and pressure data are processed by a control unit, and the control unit compares the temperature data and pressure data. Based on the comparison, the control unit alters parameters of the process, such as the heating cycle, the vacuum level, and/or the vacuum timing. For example, if the temperature data indicates that the sheet has been heated to a relatively high temperature, the control unit sends output to the vacuum source to reduce the amount of vacuum drawn on the sheet to prevent tearing. Similarly, if the temperature data indicates that the sheet has been heated to a relatively low temperature, the control unit sends output to the vacuum source to increase the amount of vacuum drawn on the sheet because the sheet requires that additional vacuum to form properly. Additionally, in response to the comparison of temperature and pressure data, the control unit may send output to the heating module to increase or decrease the heat applied to the sheet while keeping the vacuum unchanged.

By using the process of the present invention to monitor and manipulate pressure, temperature, and/or other parameters, less waste is produced.

These and other objects, advantages, and features of the invention will be more readily understood and appreciated by reference to the detailed description of the preferred embodiments and the drawings.

BRIEF DESCRIPTION OF THE DRAWINGS

FIG. 14b is a detailed view of a pressure drop taken from a position corresponding to the detailed view of FIG. 14a.

DETAILED DESCRIPTION OF THE PREFERRED EMBODIMENT

Figure 1:
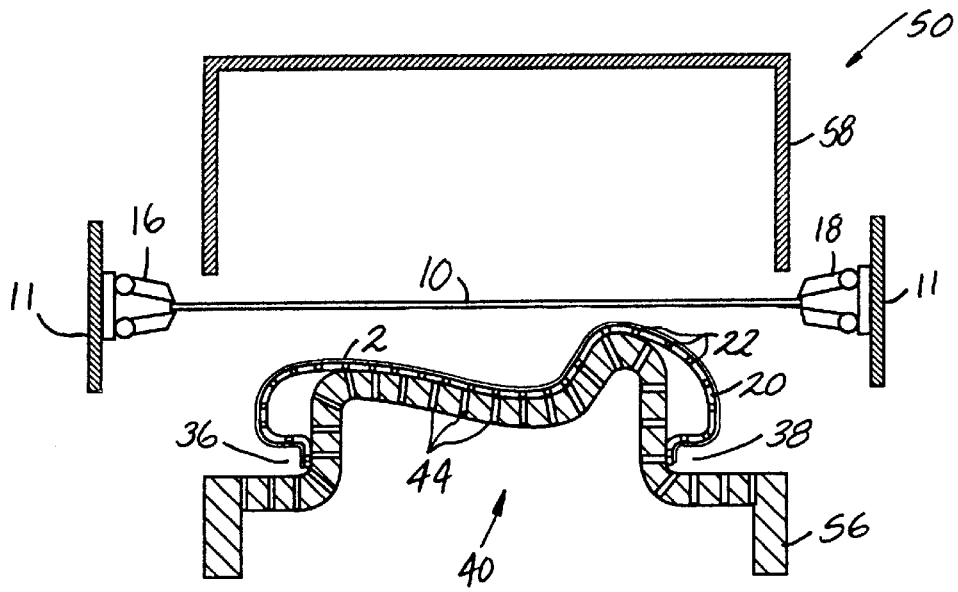
FIG. 1 is a sectional view of a prior art vacuum mold before the mold is closed.
Figure 2:
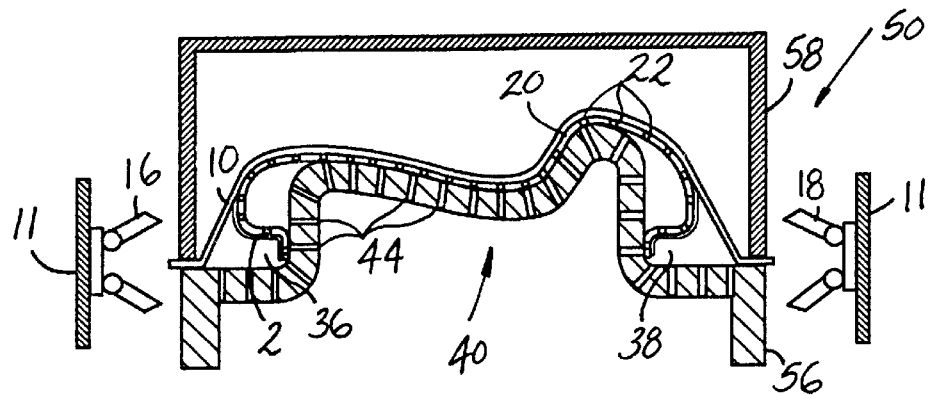
FIG. 2 is a sectional view of a prior art vacuum mold as the mold is closed.
Figure 3:
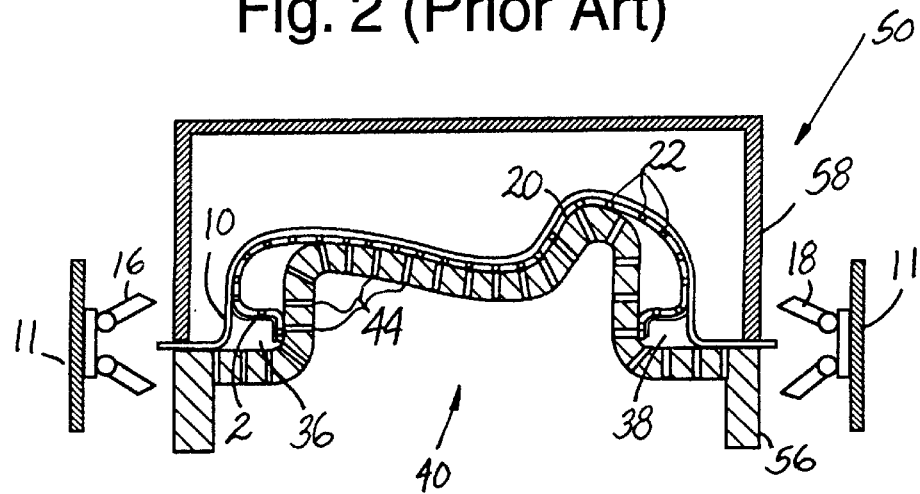
FIG. 3 is a sectional view of a prior art vacuum mold as a vacuum is initially applied in the mold.
Figure 4:
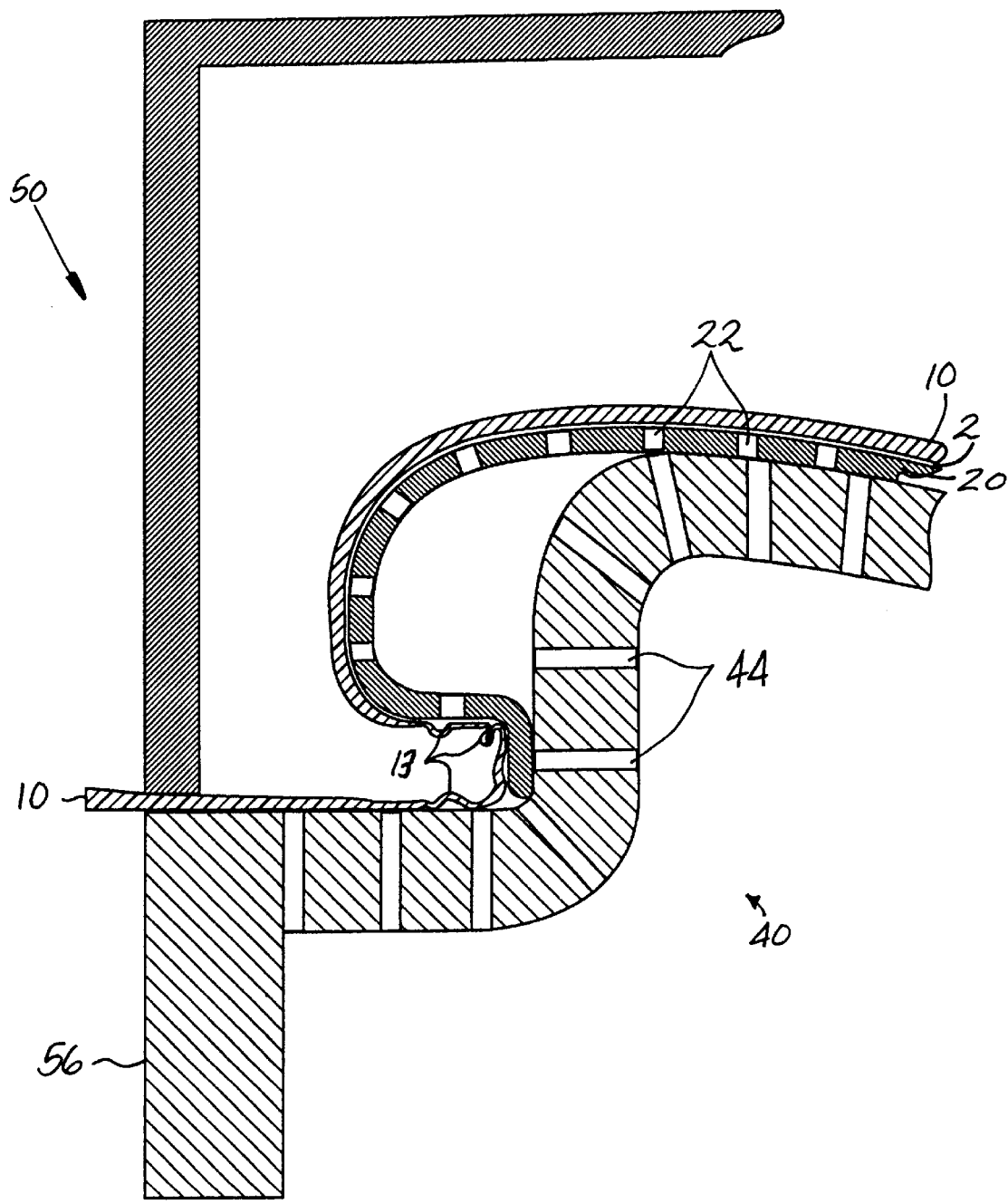
FIG. 4 is a sectional view of a prior art vacuum mold after the vacuum has drawn the sheet into conformity with the substrate.
Figure 5:
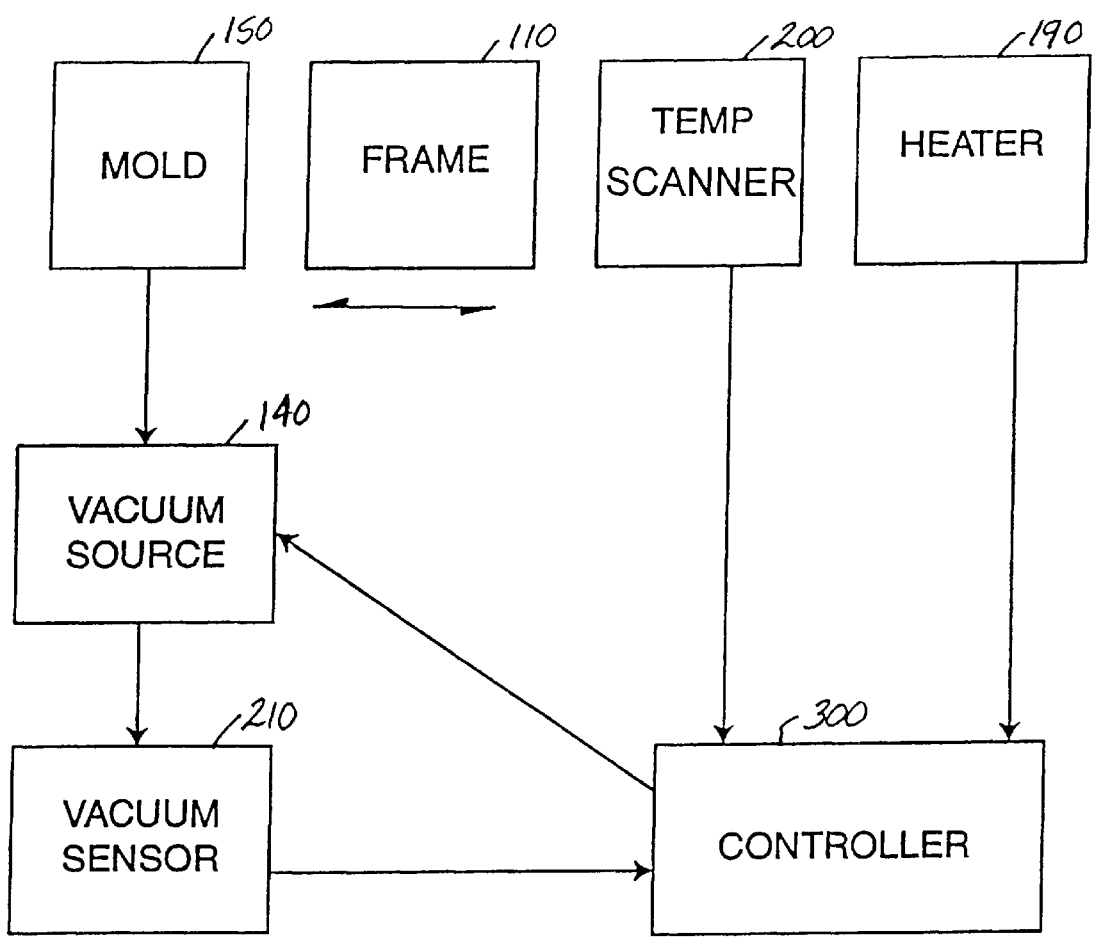
FIG. 5 is a schematic view of a system of the present invention.

A system according to a preferred embodiment of the invention is schematically depicted in FIG. 5. The system generally includes a mold 150 with a vacuum source 140, a heater 190, and a frame 110 movable between the mold 150 and the heater 190. The frame 110 is used to transport a formable sheet processed according to the present invention. Temperature scanner 200 monitors the amount of heat added to sheets carried on the frame 110 by the heater 190. A vacuum sensor 210 monitors the amount of vacuum supplied in the mold 150 by the vacuum source 140. Both the temperature scanner 200 and vacuum sensor 210 communicate with controller 300, which monitors and may be used to control the process of vacuum forming.

The vacuum wrapping apparatus and related method of manufacture of the preferred embodiment will now be described. The process and apparatus for controlling the vacuum wrapping method and related apparatus will be described in further detail below. It will be appreciated that although the preferred apparatus and methods are directed to vacuum wrapping equipment and processes, that is, equipment and processes for securing a sheet to a substrate in a mold, the present invention is similarly applicable to vacuum forming equipment and processes, that is, molding rigid formable material into contoured substrates with a vacuum. Therefore, the use of vacuum wrapping in this application encompasses both vacuum wrapping and vacuum molding.

Figure 6:
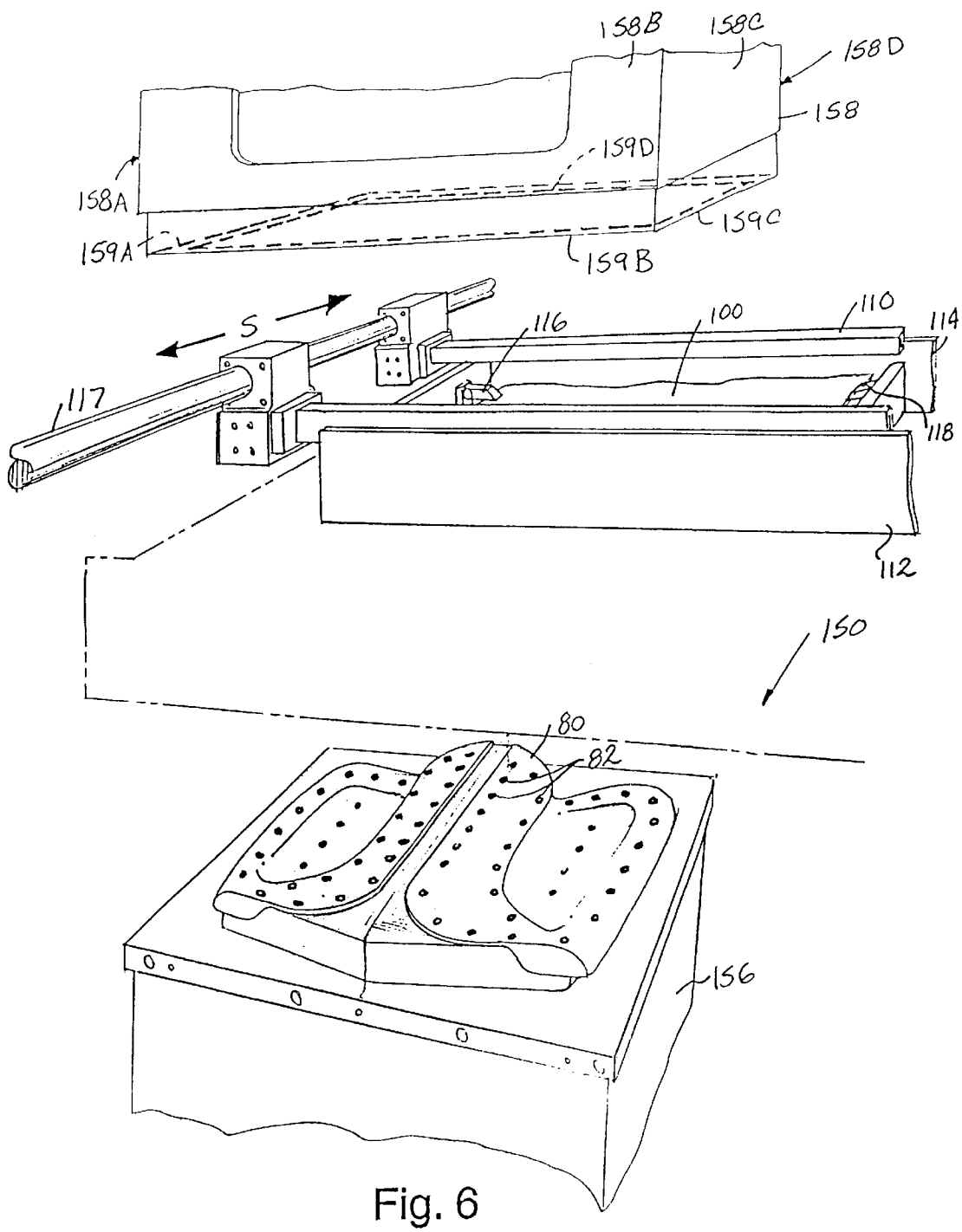
FIGS. 6 and 6a are perspective views of the vacuum mold of the present invention before and as the mold is closed.
Figure 6A:
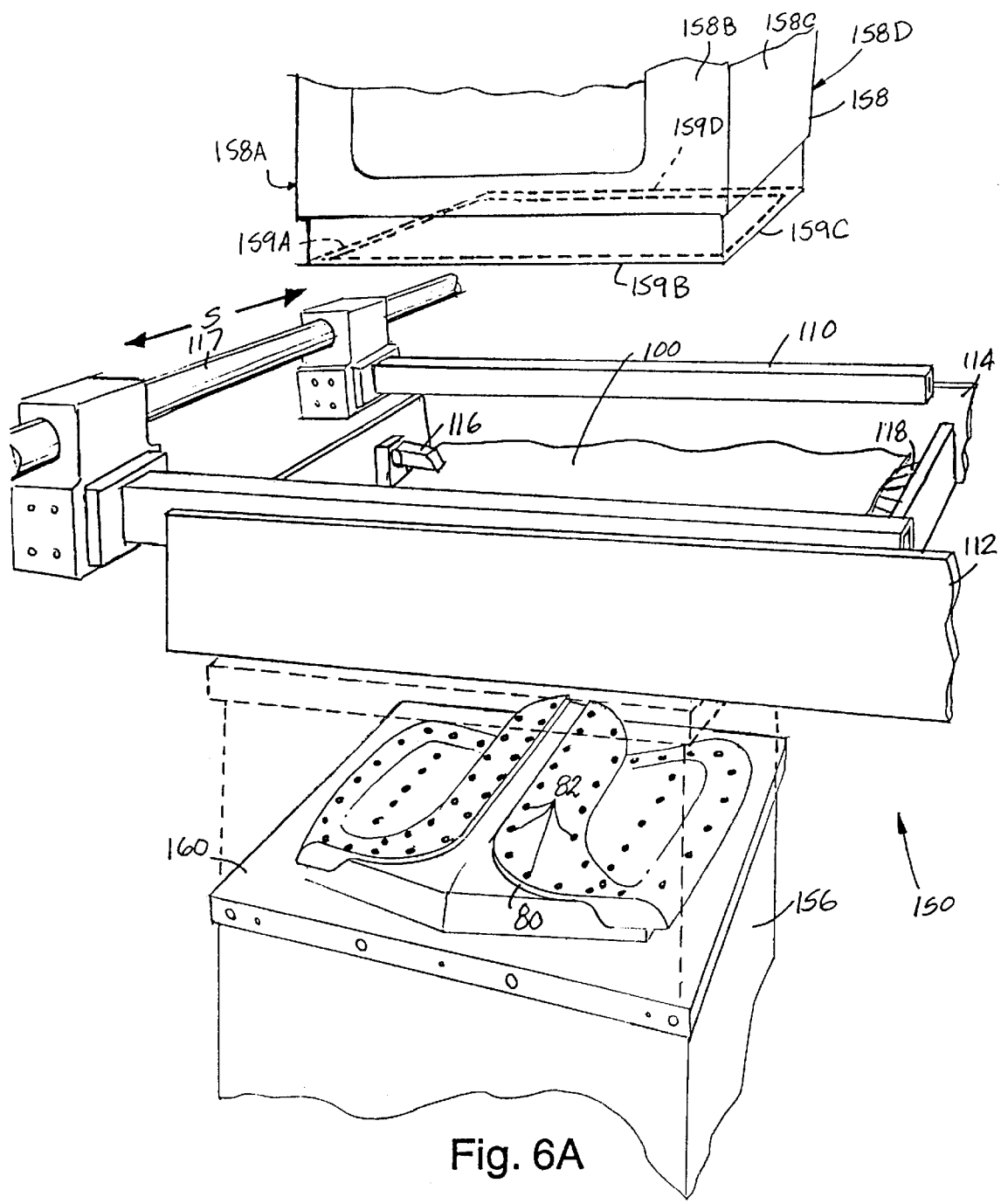
Figure 12:
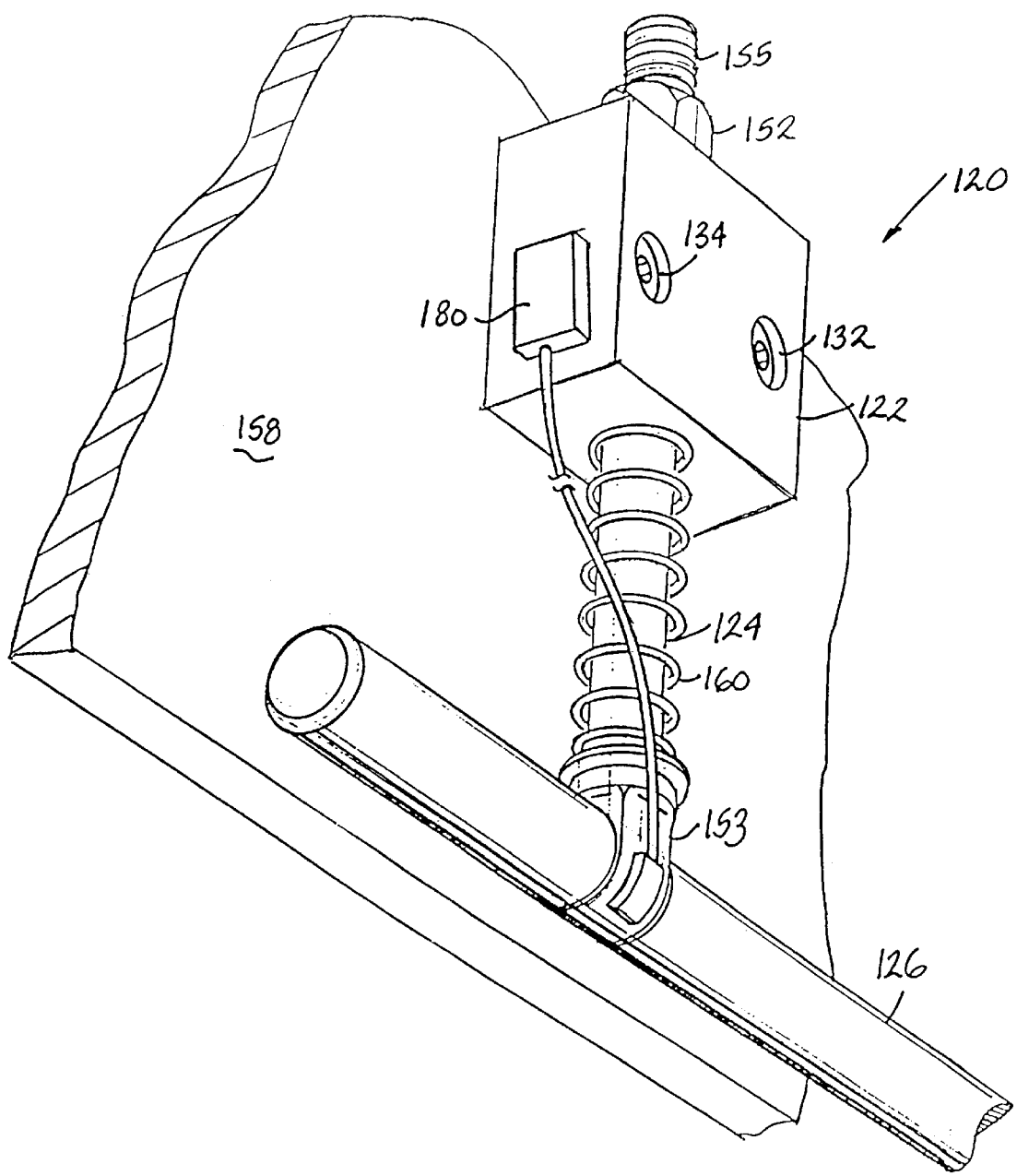
FIG. 12 is a perspective view of the clamping device.
Figure 13:
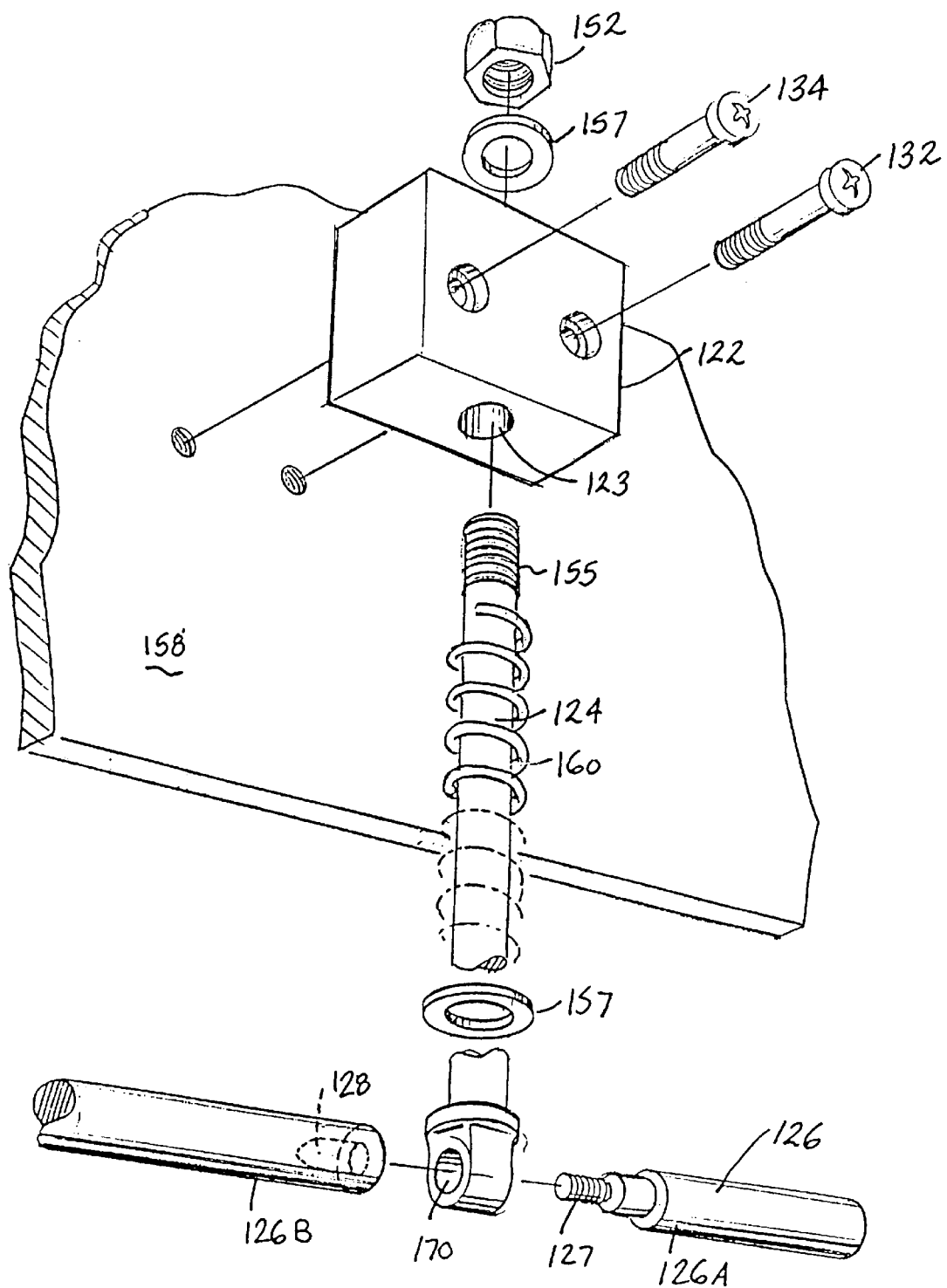
FIG. 13 is an exploded perspective view of the clamping device.

FIGS. 6 and 6a depict the molding apparatus used in the preferred process of the present invention wherein a material such as a fabric is adhered to a thermoplastic substrate having substantial contours. FIGS. 7–11 illustrate the sequential steps involved in the preferred process. FIGS. 12 and 13 depict preferred and alternative embodiments, respectively, of the clamping device.

With reference to FIGS. 6 and 6a, the complete mold 150 generally includes platen 158, and contoured mold or nest 156 on which substrate 80 is disposed. Platen 158 is positioned directly above the nest 156. The contoured nest 156 is configured to produce a particular article, namely, an interior door panel for a vehicle such as an automobile, a van, or a recreational vehicle. It should be understood that the mold configured and used in accordance with the present invention to vacuum form materials to substrate 80 is compatible with types of articles having either vehicular or non-vehicular applications.

The mold 150 in FIGS. 6 and 6a includes a frame 110 including side members 112 and 114, the side members are slidably disposed on frame shaft 117 and are slidable in directions S as depicted. The frame 110 is slidable on frame support shaft 117 to positions over the mold 150 and proximate the heater 190 (FIG. 5) where the sheet 100 may be heated to become pliable. It will be appreciated that the frame 110 may be moved manually to various stations in the forming process rather than guided on frame supports.

Platen 158, as shown in FIG. 6, is a casement comprised of sidewalls 158a, 158b, 158c and 158d. The interior edges 159a, 159b, 59c and 159d of the respective sidewalls 158a–158d serve as an effective mold perimeter 160 when the platen 158 is closed against contoured mold or nest 156.

As will be appreciated, the mold 150 depicted in FIGS. 6 and 6A is referred to as a two cavity family mold. In this single mold, a single sheet 100 may be wrapped over two side-by-side substrates. Of course, multiple substrates may be disposed in the single mold 150 as the application requires. In another embodiment, dual molds (not shown), each similar to the mold of the preferred embodiment, are run simultaneously. Each of the two molds include a single substrate disposed on a single nest. A first sheet is wrapped over one substrate and simultaneously a second sheet is wrapped over a second substrate. Of course, multiple molds may be run together simultaneously to wrap a plurality of substrates. It will be appreciated that any mold known in the art may be substituted for the two cavity family mold and the two simultaneously run molds.

Figure 7:
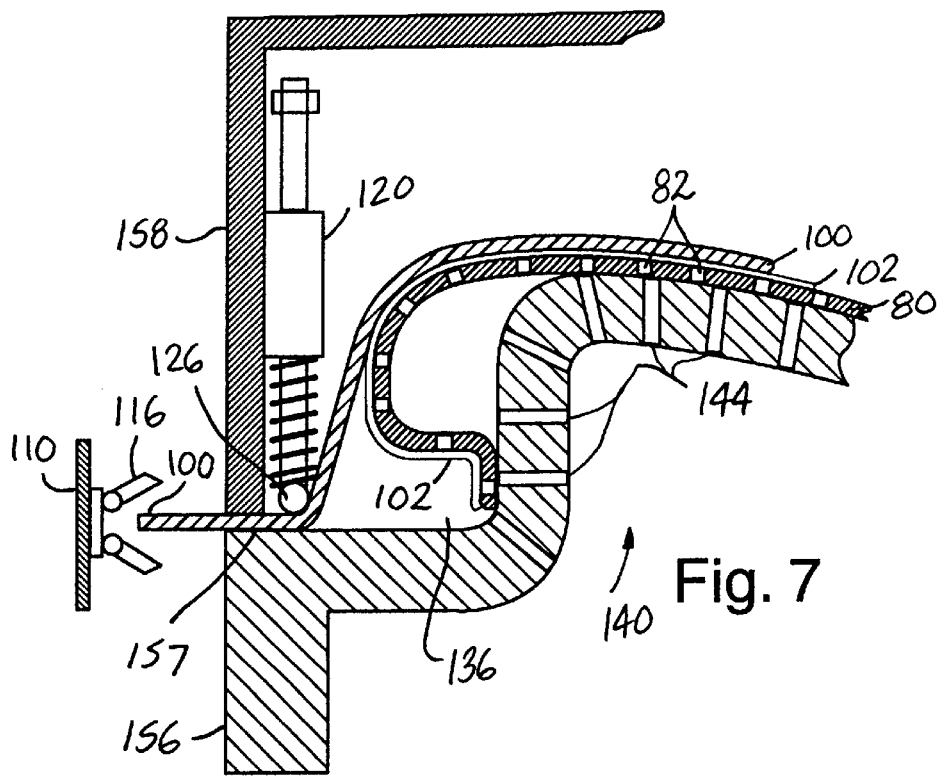
FIGS. 7–11 are sectional views of a clamping device and sequential steps in the method of the present invention.

As depicted in FIGS. 6 and 7, the contoured nest 156 includes a plurality of contoured surfaces that correspond to some degree to the substrate 80. A plurality of vacuum holes 144 are provided in the surface of the nest 156 and are in fluid communication with a conventional vacuum source 140. The vacuum holes 144 are provided at spaced intervals along lines which form the intersection of substrate surfaces. The vacuum source 140 is in further communication with a vacuum sensor (FIG. 5) to monitor the vacuum applied through the substrate 80 and consequently to the sheet 100. It will be appreciated that if the present invention is used to vacuum form substrates, the mold would substantially correspond to the desired contours of the completed substrate. The mold may also be multi-sectional to facilitate removal of the formed substrate.

In the preferred embodiment, the substrate 80 is a porous thermoplastic substrate. The substrate in FIGS. 6 and 7 is porous due to a plurality of holes 82 provided therein. Any other structure may be included on or in the substrate 80 so that the vacuum supplied through vacuum source 140 and vacuum holes 144 is communicated through the surface of the substrate 80. Substrates suitable for use in the present invention are constructed from thermoplastics such as, but not limited to, polystyrene, ABS (a polymerized mixture of styrene, acrylonitrile and nitrile rubber), polyproplyene, polyethylene, polyvinyl chloride, polyester or nylon. The substrate 80 of the preferred embodiment is about 0.05 inches in thickness; however, any thickness substrate may be used as desired. As will be appreciated, substrates also may be constructed from materials such as thermoset polymers, cardboard, wood fiber, metal, alloys, or any other material as the application requires.

The sheet 100 used in the preferred embodiment of the present invention is a fabric. "Fabric" refers to any single or multiple layer construction capable of responding to a partial or complete vacuum. The preferred fabric is a polyvinyl chloride skin adhered to a foam layer. The skin is preferably washable, and the foam layer is preferably of sufficient thickness to provide comfortable padding. It will be appreciated that the fabric may be constructed of any material, including, but not limited to, polyester, nylon, synthetic and non-synthetic fibers and the like.

Although in the preferred embodiment an adhesive is applied to the substrate, an adhesive may alternatively be applied to the fabric to bond the fabric to the substrate. In such an embodiment, a heat-activated adhesive 102 is adhered to the fabric backside. Any type of heat-activated adhesive as will be appreciated, may be used. When the heat activated adhesive is heated, it bonds the sheet of fabric 100 to the substrate 80 as the fabric 100 is brought into contact with the substrate 80. It will further be appreciated that the adhesive need not be heat-activated; rather, a pressure-sensitive adhesive may be used.

In the preferred embodiment, the fabric 100 is heated to become formable using conventional heating techniques such as convection heating, radiant energy heating, infrared heating, and the like. The preferred heating method is controlled by a unique process that monitors the temperature of the thermoformable material, among other parameters, and alters further processing in response thereto, as will be described in further detail below. Once the fabric of the preferred embodiment of the present invention is sufficiently pliable, the preferred process of applying the fabric to the substrate 80 is carried out as depicted in FIGS. 7–11.

It will be appreciated that where pliable fabrics are used that do not require heating to be vacuum wrapped, the above step of heating the fabric may be selectively omitted from the preferred process.

With reference to FIGS. 7–11, the mold 150 of the present invention includes clamping device 120 fastened to the platen 158. The clamping device 120 is positioned so that when the platen 158 is disposed in close proximity to the nest 156, the clamping device 120 compresses the sheet 100 against the surface 157 of the contoured mold or nest 156.

With particular reference to FIGS. 12 and 13, the preferred clamping device includes a support body 122, an elongated shaft 124, and a bar 126 coupled to end portion 153 of the elongated shaft 124. The support body 122 is fastened to the platen 158 with fastening bolts 132 and 134. As will be appreciated by those skilled in the art, the support body 122 may be configured in any shape and fastened to the platen 158 by welding, by bolting, by adhesion, and the like. The elongated shaft includes threaded end portion 155. Nut 152 threads onto threaded portion 155. Washer 157 is disposed adjacent the nut 152. In combination, the threaded portion 155 and nut 152 attach the elongated shaft 124 to the support member 122 when the elongated shaft 124 is displaced through the internal bore 123 defined by the support member 122.

The nut 152 may be threaded onto the threaded portion 155 to varying degrees. Accordingly, the biasing element 160, as shown a helical spring, may be biased as desired. As shown, the helical spring 160 is disposed around the elongated shaft 124. It will be appreciated that the helical spring 160 may be substituted with any other conventional biasing element such as a leaf or torsion springs to provide bias between the support member 122 and the end portion 153 of the elongated shaft 124. Alternatively, the entire biasing mechanism may be replaced with a hydraulic unit capable of holding the bar 126 or other non-rotatable member at a predetermined distance from the support member.

With further reference to FIGS. 12 and 13, washer 157 is disposed around the elongated shaft 124 adjacent end portion 153 to provide a seat for the spring 160. The end portion 153 includes a bore 170 therethrough. The bar 126 is rotatably disposed through the bore whereby threaded portion 127 of bar portion 126a threadably interfits into bar void 128 of bar portion 126b so that the completed bar 126 is rotatably coupled to the end portion 153.

It will be appreciated by those skilled in the art, the bar may be of a unitary construction and affixed to the end portion 153 in any manner as desired. For example, it is not necessary that the bar be rotatable. The rotatable bar 126 may be replaced with a stationary member of any shape or cross section coupled to or integral with end portion 153.

Preferably, the bar 126 or other member is disposed along all of the perimeters of the mold, contacting all the edges of a sheet. It will be appreciated, however, that the bar or member may be disposed only in specific regions of the mold to contact the sheet where the control of stretch in the sheet is desired.

There will now be described the preferred apparatus used to control the vacuum wrapping process. With reference to FIG. 5, the process control apparatus includes temperature scanner 200 and vacuum sensor 210, both in electrical communication with controller 300.

The temperature scanner 200 is preferably positioned adjacent heater 190, over the path of the frame 110 and the sheet (not shown) held in the frame. The temperature scanner 200 is disposed close enough to the path of the frame 110 and sheet so that it can create a two dimensional data scan of the temperature of the sheet. It will be appreciated that the temperature scanner or similar detector may be placed in proximity to any station, as long as it can collect temperature data from sheets. For example, the temperature sensor may be placed in the mold. The preferred temperature scanner 200 is a RayTek temperature scanner available from RayTek Corporation of Santa Cruz, Calif., but any suitable temperature sensing device may be used. The temperature scanner is in communication with controller 300, so that any temperature data relating to sheets gathered by the scanner may be output to the controller.

The vacuum sensor 210 preferably is positioned in fluid communication with the vacuum source 140 so that it can collect data relating to the vacuum, or negative pressure created in the mold 150 over periods of time during the forming process. It will be appreciated that the vacuum sensor may be disposed anywhere, including in the mold, where it can detect the vacuum level drawn on the sheet. The preferred vacuum sensor is an Omega Vacuum Transducer, available from Omega Engineering, Incorporated, of Stamford, Conn., but any suitable vacuum sensing device may be used. The vacuum sensor 210 is in communication with controller 300, so that collected vacuum data may be output to the controller.

The controller 300 is in communication with the vacuum sensor 210 and the temperature sensor 200 so that it may acquire any data output from the vacuum sensor 210 and the temperature sensor 200. The preferred controller is a DS5000 DARTScanner™, available from RJG, Incorporated of Traverse City, Mich.; however, any suitable data acquisition controller may be used. The controller 300 is preferably capable of receiving data acquired from the temperature scanner 200 and vacuum sensor 210 in real time. The controller also includes output means, such as a computer monitor (not shown) where the data acquired from the temperature and vacuum sensors may be displayed in various configurations. The controller further may be in communication with a suitable audible, viewable, or otherwise perceptible alarm (not shown).

Controlled Release Operation

With reference to FIGS. 7–11, the preferred process of controlling the release of a sheet drawn by a vacuum during wrapping will now be described. It will be appreciated that this operation may similarly be used where a thermoplastic sheet is vacuum formed as well. In the preferred embodiment depicted in FIG. 7, the platen 158 is closed against contoured nest 156. The sheet 100, already heated according to a preferred method described below, is pinched between the platen 158 and nest surface 157. The bar 126 of the clamping device 120 is in contact with the sheet 100 and exerts an additional force to compress the sheet against the nest surface 157. This additional clamping force, however, is unnecessary in most applications because the sheet is already held between the molds. Accordingly, as desired, the clamping device 120 may be selectively contacted with the sheet after the mold is opened. Clamping device 116 that was used to position the sheet 100 over the substrate 80 is opened to release the free edge of the sheet 100.

Figure 8:
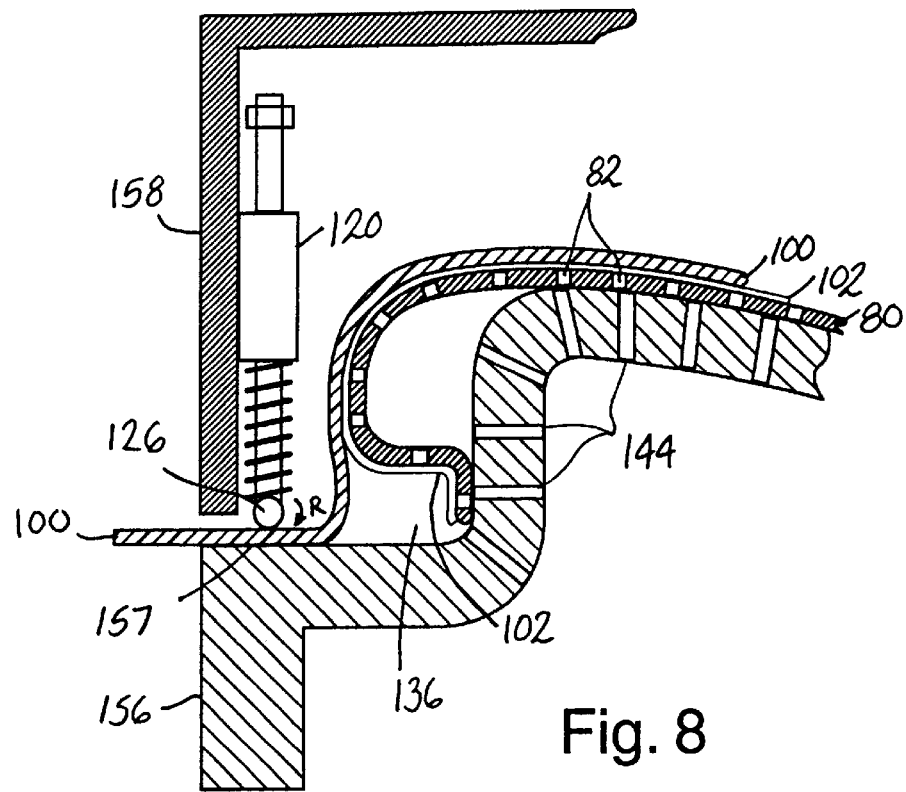

According to another step of the method as shown in FIG. 8, as the platen 158 is raised in relation to the contoured nest 156, the vacuum supplied through vacuum holes 144 simultaneously is increased. The increase is dependent on another preferred process of the present invention that monitors and controls the temperature of the sheet and the level of vacuum draw, as will be discussed in further detail below. The bar 126 of clamping device 120 compresses the sheet 100 against the nest surface 157. This compression creates a frictional force on the sheet 100 along the nest surface 157 whereby the draw of the sheet 100 toward and into abscess 136 is controlled, that is, either retarded or accelerated as desired. The compressive force and consequently the rate of draw of the sheet 100 by the vacuum is preferably controlled by changing the distance platen 158 is from nest 156. It will be appreciated that the compressive force may also be altered by changing the spring of the clamping device 120, or the hydraulic forces generated in a hydraulically assisted clamping device. As the sheet 100 is drawn into the abscess 136, bar 126 rotates in a direction R. Preferably, the pressure exerted on the sheet in any given point along the bar 126 is constant; however, it may be altered from region to region so that the rate of draw of the material is selectively controlled.

With reference to FIG. 7, it will be appreciated that the level of vacuum drawn on the sheet need not be increased. For example, if the vacuum is significant enough to pull the sheet 100 into the recesses 136 when platen 158 is raised, that single vacuum level is sufficient to wrap the sheet 100 on the substrate 80. In this case, the compression of the sheet 100 between the clamping device 120 and the nest surface 157 may be altered to control the rate of draw of the sheet 100 into recess 136 by the vacuum.

Figure 9:
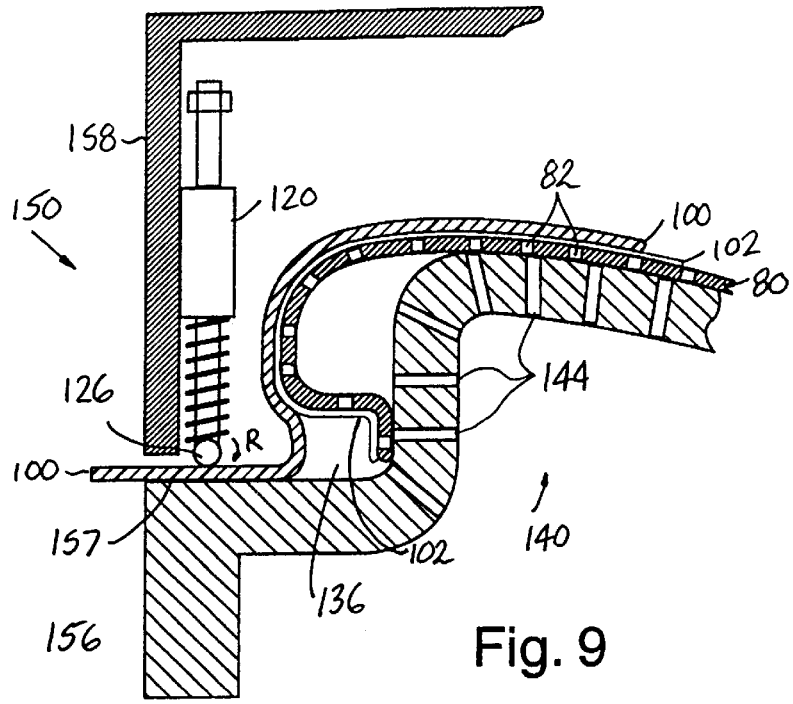
Figure 10:
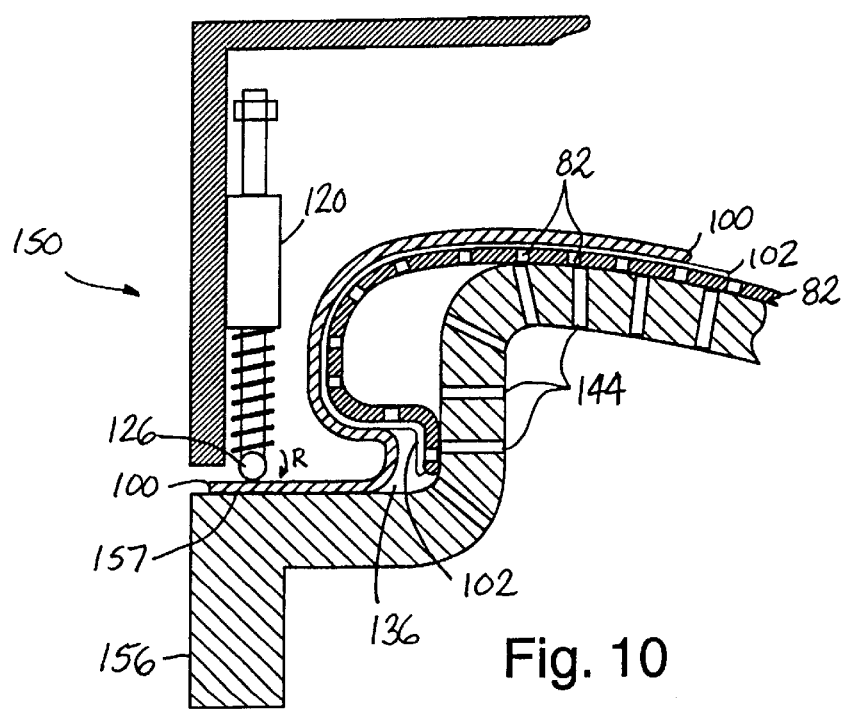

With reference to FIGS. 9 and 10, a vacuum applied through vacuum holes 144 continues to draw the sheet 100 into the abscess 136. The free edge of sheet 100 moves toward the abscess 136 as sheet 100 is pulled toward the substrate 80. The bar 126 of the clamping device 120 continues to exert pressure against the sheet 100 to control the rate at which the sheet 100 is drawn into abscess 136 by the vacuum applied through vacuum holes 144.

Figure 11:
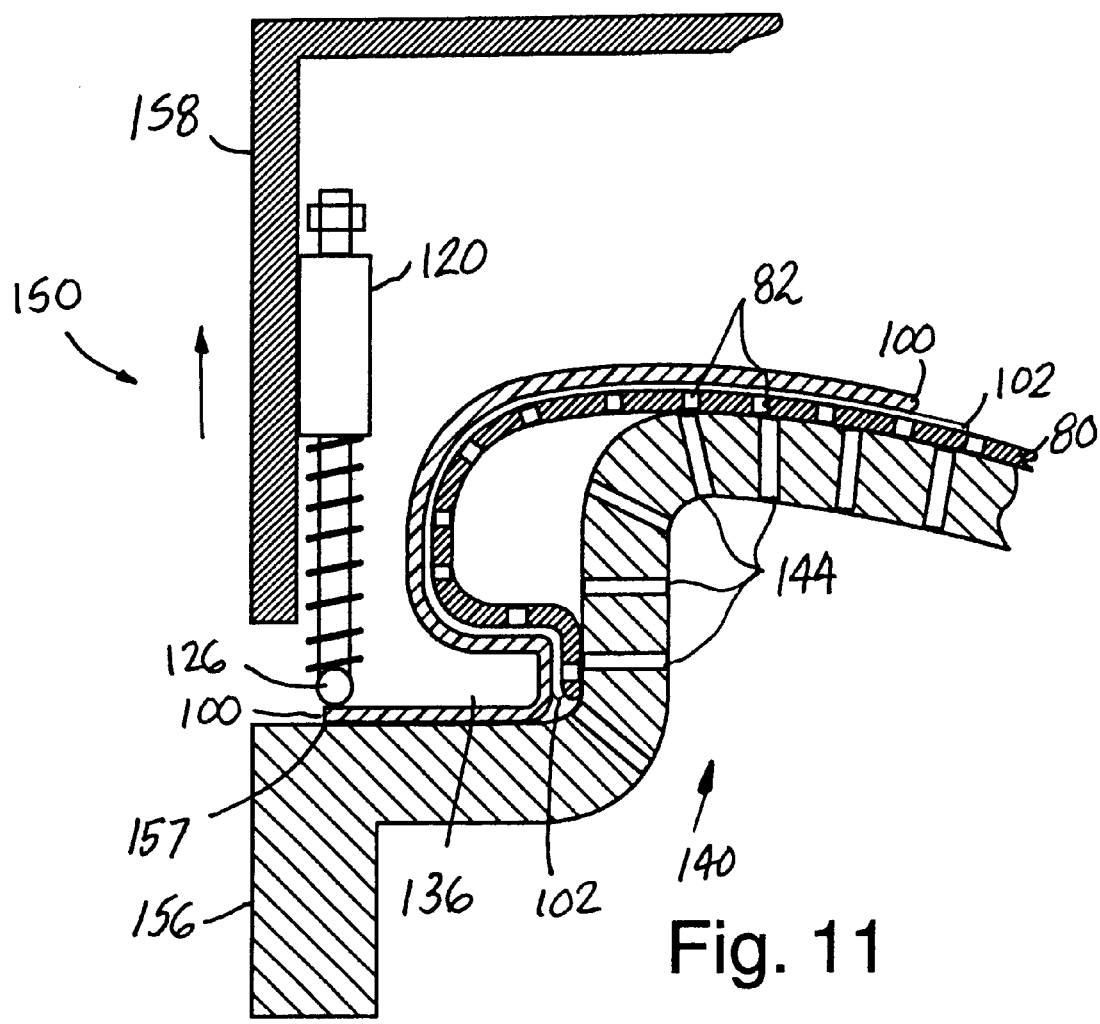

As depicted in FIG. 11, the sheet 100 has been fully drawn into the abscess 136 and is in complete contact and adhered to the substrate 80 with adhesive 102. The mechanical adhesion between the sheet 100 and the substrate 80 maintains the desired shaping of the sheet in accordance with the non-planar configuration of the substrate 80. As can be seen, the clamping device 120 has sufficiently controlled the rate at which the sheet 100 has been drawn into the abscess to prevent any unnecessary stretching or wrinkling. Moreover, the sheet 100 covering the contours of the substrate has resisted deformative stretching and subsequent tearing. The free edge of the sheet 100 as depicted is proximate the point of contact of the roller 126 with the sheet 100.

With reference to FIG. 11, after the material adheres to the substrate 80, the vacuum applied through vacuum holes 144 is decreased, and may be deactivated if desired. As can be seen, the finished substrate is evenly coated with an unwrinkled sheet 100. The platen 158 is raised so that the sheet-covered substrate may be removed from the contoured nest 156, trimmed and further processed according to conventional techniques.

Other articles are formable in accordance with the method of the present invention, including vehicle-related interior body parts such as headliners, dashboards and aircraft cabin panels.

The particular operation of the clamping device 120 will now be described with reference to FIGS. 7–13. The clamping device 120 of the preferred embodiment is disposed against the formable sheet 100 to compress the sheet 100 against the nest surface 157. With the sheet 100 held against the mold surface 157, a vacuum is maintained under the sheet. The spring biases the lower portion 153 of the elongated shaft 124 downward and, consequently, presses the bar 126 against the sheet. Because the sheet is compressed between the surface 157 and the bar 126, the vacuum is maintained under the sheet 100 as it is drawn against the substrate 80. Incidentally, this compression of the sheet between surface 157 and bar 126 also creates forces of friction that restrict the drawing of the sheet therebetween. By varying the distance of the platen 158 from the contoured nest 156, the amount of pressure exerted by the bar 126 against the sheet 100 and, consequently, the rate at which the sheet 100 is drawn by vacuum may be controlled as will be appreciated by those skilled in the art. The amount of pressure exerted by the bar 126 against the sheet 100 may also be altered by using high compression springs as desired.

With reference to FIGS. 8–10, as the sheet 100 is drawn into the abscess 136 by vacuum, the bar 126 rotates. Accordingly, the sheet may be drawn between the nest surface 157 and the bar 126. It will be appreciated that in embodiments with non-rotating friction members instead of bars, the member simply holds the sheet 100 against the surface 157 during draw. The bar 126 may be positioned anywhere over nest surface 157 to compress sheet 100. The bar need only compress about 10–20% of the edge 102 to properly control the rate of draw into abscess 136.

Vacuum Wrapping Control Process

There will now be described the preferred process for controlling the vacuum wrapping process and related apparatus. It will be appreciated that although the preferred process is directed to controlling a vacuum wrapping method, the process also may be directed to controlling a method of vacuum forming a formable substrate. With reference to FIG. 5, the preferred control process includes acquiring various data from the vacuum source 140 via the vacuum sensor 210 and the heater 190 via the temperature scanner 200, outputting the data to controller 300, superimposing that data on a chart (see FIG. 14), and displaying the data using conventional means such as on a monitor. The data may then be used in decision-making processes to adjust various parameters in the process to reduce defects to sheets. The decision-making may be carried out either through human intervention or computerized process control in real time.

The various parameters capable of being adjusted in the vacuum wrapping for forming process include, but are not limited to, the amount of heat added to the sheet during the sheet heating cycle, the duration for which the sheet is heated, the level of vacuum in the mold, the vacuum timing, and the period for which the vacuum is applied, and various other parameters as will be appreciated by those skilled in the art.

Figure 15:
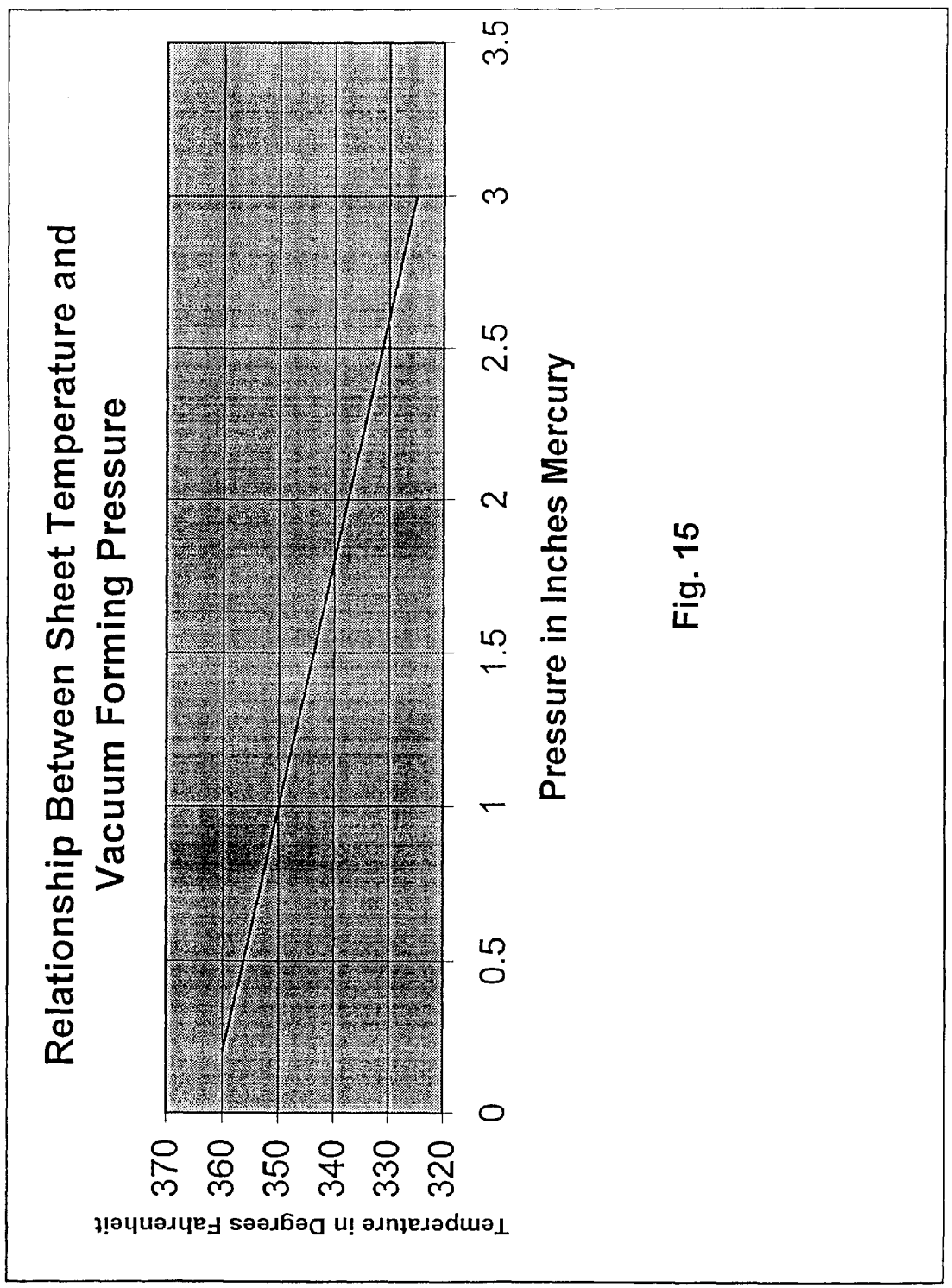
FIG. 15 is a chart depicting the relationship between sheet temperature and vacuum.

It has been discovered that the amount of heat added to a sheet (e.g. the temperature of the sheet) and the vacuum level are most preferably manipulated due to their inverse relationship. As the amount of heat added to a sheet is increased, the level of vacuum used to form the sheet may be decreased. A chart illustrating this inverse relationship is illustrated in FIG. 15. As can be seen, as the temperature increases, less vacuum may be used to wrap the sheet. The chart is illustrative only and not meant to restrict the scope of the invention. Depending on the variation of parameters and the apparatus used, the relationship between temperature and pressure may vary widely.

As an example, it has been discovered that sheets heated excessively are more prone to have a hole torn through them by a vacuum drawn on the sheet than sheets not excessively heated. It has been surmised that the excessively heated sheets attain an almost plasma-like consistency that promotes tearing under high vacuum levels.

Conversely, as the amount of heat added to a sheet is decreased, the level of vacuum used to form the sheet may be increased. For example, sheets that are not appropriately heated may be drawn by very high vacuum levels. It has been surmised that these "cold" sheets are structurally strong, and therefore resistant to tearing by vacuum forces. However, there is a limit as to how "cold" a sheet may be; the sheet should be pliable enough to vacuum form onto a substrate with its heat-activated adhesive.

In the preferred process of controlling vacuum wrapping of the present invention, the fabric sheet should be at a temperature of about 320 to about 360 degrees Fahrenheit when formed under vacuum levels of about 0.1 to about 3.0 inches of mercury. It is more preferred that fabric sheet be at a temperature of about 330 to about 350 degrees Fahrenheit when drawn under vacuum levels of about 1.0 to about 2.5 inches of mercury. It is most preferred that the fabric sheet be at a temperature of about 340 degrees Fahrenheit when drawn under a vacuum level of about 1.8 inches of mercury.

With reference to FIG. 5, data is acquired from the vacuum sensor 210 and the temperature scanner in real time and output to controller 300. A cycle of the preferred process begins with a sheet held in frame 110 having an amount of heat energy added to the sheet for a period of time in the heater 190. The sheet is moved in the frame 110 from the heater 190 to the mold 150. As the sheet is moved, it passes the temperature scanner 110, preferably a RayTek temperature scanner, which monitors and measures the amount of heat energy stored in the sheet. The temperature scanner produces and records a two-dimensional scan of the existing heat energy (temperature) of the sheets. The temperature scanner then produces an output summary of the temperature data gathered from the scan.

The preferred output data summary are temperature intervals of the whole sheet. Other output data summaries that may also be used and transferred to the controller as desired include summaries of specific areas of the sheet which may be programmed by the user, or minimum, maximum, or average temperatures. After being produced, the preferred output summary is passed in real time to the controller which processes and displays the temperature output summary as described in further detail below.

According to another step in the preferred process, the sheet is moved in the frame 110 to the nest 156. The sheet is wrapped according to the preferred vacuum wrapping process as explained above and illustrated in FIGS. 7–11. More particularly, the sheet 100 is placed in contact with substrate 80. The mold 150 is closed, pinching the sheet between platen 158 and nest surface 157. A low level vacuum is applied to the sheet 100 for a period of time to draw it into conformity with the simple contours of the substrate 80. Next, the mold is opened to release the sheet from between platen 158 and nest surface 157. Simultaneous with the opening, a high level vacuum of about 1 to about 30 inches, and more preferably 1 to 3 inches, and most preferably 1.8 inches of mercury draws the sheet into substantial conformity with the remainder of the substrate, in particular, the deep recess 136. This high level of vacuum is applied for a period of time preferably about 2 to 60 seconds, more preferably 5 to 30 seconds, and most preferably about 10 seconds. The clamping device 120 selectively restricts the draw of the sheet 100 by the vacuum by supplying an amount of compressive force against the sheet for a period of time. Finally, the vacuum is reduced to nearly zero once the sheet has been completely wrapped. It will be appreciated that the process of the present invention is not limited to two stage vacuum levels; single or multiple vacuum levels may be employed to vacuum wrap a sheet or vacuum form a formable material. Moreover, the vacuum levels applied may be increased, decreased or maintained as desired in any order to wrap or form a material.

With reference to FIG. 5, in another step of the preferred process, the vacuum sensor 210 monitors and measures the actual vacuum levels present in the mold 150 during vacuum wrapping. This vacuum data is sent as an output summary to the controller in real time.

The controller 300 acquires the temperature output summary and the vacuum output summary from the temperature scanner 200 and the vacuum sensor 210, respectively. It will be appreciated that the temperature scanner 200 and the vacuum sensor 210 data is created by different programs utilized by each of those items. Therefore, the data may be converted to a common computer language by the controller so that the controller may output the data in chart or other forms on a display screen or monitor. Depending on the sensors used, and the application, conversion and manipulation of the data will vary.

According to another step of the preferred process, the output summaries are compared to prescribed limits or preferred parameters established for heat added to sheets, periods of heating the sheets, levels of vacuum used to draw the sheets during molding, periods of vacuum draw and other parameters as will be appreciated by those skilled in the art. The comparison may substantially be used to provide trend analyses for heat added to the sheet, vacuum levels used, or the like. These trends may then be used to provide statistical process controls or to provide alarm signals.

Figure 14:
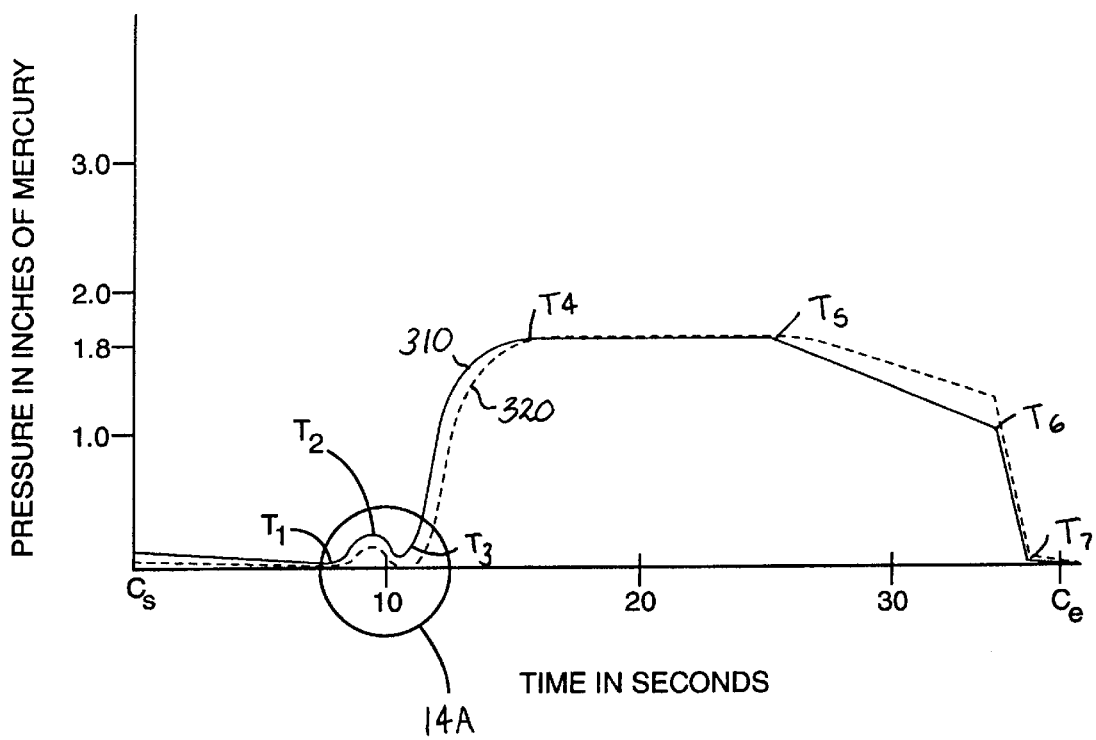
FIG. 14 is a chart depicting a comparison of an output vacuum level summary and a preferred vacuum level.

In the preferred process, the control unit processes and displays the trends and comparisons on a monitor the preferred limits superimposed on real time output summaries for various parameters. FIG. 14 depicts an exemplary chart that might be displayed on a monitor illustrating the vacuum output summary of measured vacuum levels in a process cycle superimposed on and consequently comparable to the preferred limits for vacuum levels. Depending on various parameters of the process, such as the amount of heat added to the sheet during the heating cycle, the period the sheet is heated, the level of vacuum in the mold, the vacuum timing, and the period the vacuum is applied, the values in other charts may vary significantly from the exemplary chart. Notably, the graphic chart may be substituted with any means useful for comparing the measured output summaries to baseline or preferred limits.

In the exemplary chart of FIG. 14, the X-axis represents time in seconds and the Y-axis represents pressure drawn on a sheet in inches of mercury. The vacuum wrapping cycle begins at time Cs and ends at time Ce. The duration of time represented from Cs to Ce is about 36 seconds, but this cycle may vary as desired. Typically, one sheet is vacuum wrapped in a single two cavity family mold for a total time period of about 76 seconds, that is, two 36 second sequences or draws. Of course, two sheets may be vacuum wrapped in dual separate molds running simultaneously in a single cycle of 36 seconds. As will be appreciated, the cycles and molds used may vary depending on the application. The solid graph line 310 represents vacuum levels measured by the vacuum sensor over time during the process. The broken line is a template 320 representing the preferred vacuum level drawn on a sheet throughout the cycle at a given temperature, here, about 340 degrees Fahrenheit.

The chart in FIG. 14 will now be explained with additional reference to FIGS. 7–10. From the start of the cycle Cs until time T1, the vacuum level is set at about zero. This corresponds to the time the mold is open, and a de minimus vacuum is applied through the vacuum ports 144. At about time T1 to about time T2, a low level vacuum of about 0.2 inches of mercury is drawn on the sheet. This period corresponds to FIG. 7 where the sheet 100 is drawn to conform to the simple contours of substrate 80. As depicted, the mold 150 is closed so the sheet is pinched between platen 158 and the nest surface 157.

With reference to FIG. 14, from time T2 to T3, the low level vacuum is decreased to almost zero. From time T3 to T4, the vacuum is increased rapidly to about 1.8 inches mercury. This time period corresponds to FIG. 7 where the top platen 158 is simultaneously pulled away from nest surface 157 to release the sheet 100 and allow the sheet to be drawn into abscess 136 by the vacuum supplied through ports 144.

In the chart of FIG. 14, between time T4 and T5, a period of about 10 seconds, the vacuum remains at a constant pressure of about 1.8 inches of mercury. During this period, the sheet 100 is further drawn onto the substrate 80 as depicted in FIGS. 9 and 10, until the sheet 100 is satisfactorily bonded to the substrate 80.

After the sheet 100 is bonded to the substrate, the vacuum level is incrementally decreased about zero, as depicted from time period T5 to T6 and T6 to T7 in the chart of FIG. 14. At the end of the cycle Ce, the substrate has the sheet bonded thereto, and both may be removed from the mold for further processing.

During the process explained above and graphically illustrated in FIG. 14, the measured vacuum levels 310 are compared to the preferred vacuum level profile or template 320. This comparison may be carried out by the controller 300 of the system automatically, or manually carried out by a technician operating the system. In the manual comparison, the operator simply ensures that the measured values do not deviate substantially from the preferred profile. If the values do deviate substantially, the technician may take remedial measures. In automatic comparison, the controller 300 statistically compares the measured vacuum levels to the preferred profile. If the measured values differ by a prescribed percentage, depending on the application, the controller will generate an alarm signal to call a technician or automatically adjust the process parameters as required to prevent deformation of the sheet.

Figure 14A:
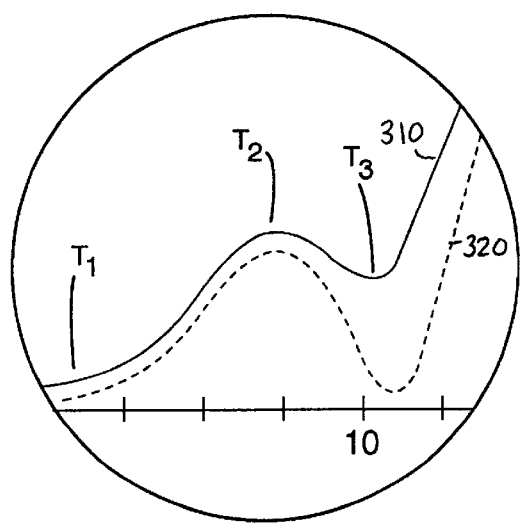
FIG. 14a is a detailed view of FIG. 14.

An example of a situation that would require remedial measures is the tearing of a sheet during vacuum wrapping. Typically, a sheet will tear under vacuum draw if it has been excessively heated or subject to excessive vacuum levels. FIG. 14a illustrates the charted vacuum pressure levels of a sheet that has been properly heated to about 340 degrees Fahrenheit, the chart being taken from FIG. 14. As can be seen, there is a smooth gradual decrease in the vacuum level after time T2, right before the vacuum level is rapidly increased at time T3 to form the sheet into complex contours.

Figure 14B:
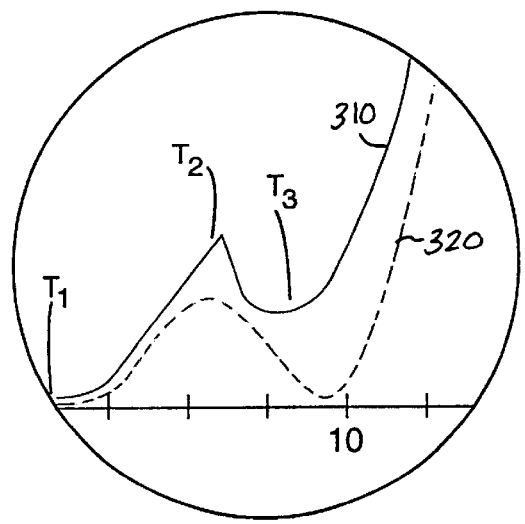

FIG. 14b is directed to the same general portion of the FIG. 14 chart illustrated in be FIG. 14a, however, FIG. 14b represents a vacuum level applied to an excessively heated sheet, for example a sheet heated to more than 350 degrees Fahrenheit. As can be seen, at time T2 there is an acute reduction in the measured vacuum level 310. Between time T2 and T3, the vacuum level drops quickly. This acute reduction is representative of a hole being torn in the sheet monitored. The vacuum level rapidly decreases after time T2 because the air of the mold environment is pulled into the vacuum source, thus negating the level of vacuum being drawn on the sheet. Depending on the severity of the tear or the level of vacuum drawn, the vacuum level 310 may drop below the preferred profile 320 for a time interval. The consequence of this situation is that the sheet adhered to the substrate is defectively torn and should be scrapped.

To prevent the tearing of sheets subsequently wrapped, the technician or controller monitoring the vacuum summary output and comparing the same to the preferred vacuum profile may make several adjustments, alone or in combination. For example, the technician or controller manually or automatically adjusts the amount of heat added to the sheet during the heating cycle, the period the sheet is heated, the level of vacuum in the mold, the vacuum timing, and/or the period the vacuum is applied.

More specifically, in the situation represented in FIG. 14b, the adjustment would entail decreasing the amount of heat added to the sheet during the heating cycle, decreasing the period the sheet is heated, decreasing the level of vacuum in the mold, or decreasing the period the vacuum is applied.

In another step of the preferred embodiment, an alarm is activated when the output summaries for the measured parameters vary from the preferred values for those parameters. For example, the alarm function may activate an audible or visual alarm when the measured values differ from the preferred parameter values by a certain percentage. The alarm calls a technician. The technician then analyzes the situation, and alone or in combination as desired, adjusts parameters of the wrapping process such as the amount of heat added to the material, the period of time the amount of heat is added, the level of vacuum, the period of time the vacuum is drawn, the timing of the vacuum, and the like.

Alternatively, the controller 300 automatically responds to the alarm by diverting the frame 110. The diverted frame 110 then transfers the defective sheets having output summaries outside given preferred values to scrap areas if the sheet has been irreparably deformed, such as by tearing during vacuum forming. The frame 110 may also transfer the sheet to reworking areas if the sheet has been overheated during the heating cycle. While in the reworking area, the sheet may cool down or later be reinserted into the vacuum forming process.

In another alternative process responsive to the alarm, the controller may use a set of feedback loops to automatically and incrementally correct and adjust various parameters of the process alone or in combination, such as amount of heat added to the material, the period of time the amount of heat is added, the level of vacuum, the period of time the vacuum is drawn, and the timing of different vacuum levels.

In the control process of the present invention, sheets are heated and vacuum wrapped serially. The data acquired from one discrete sheet may be used to adjust parameters for wrapping that sheet (real time vacuum wrapping) or adjust the parameters for wrapping a second sheet or other multiple sheets molded at different times (a multiple sheet vacuum wrapping). With reference to FIG. 5, an example of the real time wrapping process is as follows: a single sheet is heated by the heater 190, temperature scanned by the scanner 200 and transferred to the mold 150. Before the vacuum source 140 is activated, the temperature scanner 200 sends the heat data for that sheet to the controller 300. The data is compiled in the controller 300 and used to manage and/or control the level of vacuum in the mold 150. For example, the controller may output the data in chart form. Depending on the amount of heat in the sheet, an operator, either the controller or a person observing the chart, alters the amount of vacuum supplied in the mold. The vacuum 140 is then activated at the altered level specified by the operator, and the sheet is wrapped. The vacuum sensor 210 sends the data for the vacuum sensed to the controller 300 for that sheet. The operator monitors the vacuum to ensure proper application levels. Once the wrapping is complete, the vacuum is terminated and the properly wrapped sheet is removed from the mold. Another sheet is then heated and the cycle begins again.

With reference to FIG. 5, an example according to the multiple sheet vacuum wrapping process is as follows: a first sheet is heated by the heater 190, temperature scanned by the scanner 200 and transferred to the mold 150. Before the vacuum source 140 is activated, the temperature scanner 200 sends the heat data for that sheet to the controller 300. The data is compiled in the controller 300 and used to manage and/or control the level of vacuum in the mold 150. For example, the controller may output the data in chart form. The vacuum 140 is then activated at the level specified by the operator, and the sheet is wrapped. The vacuum sensor 210 sends the data for the vacuum sensed to the controller 300 for that sheet. The vacuum sensor sends the vacuum level data to the controller 300 and the controller outputs the data in chart form.

The vacuum data chart is superimposed on a second chart of a preferred level of vacuum profile. If the data collected for the sheet deviates from the preferred vacuum profile, that information is noted by the operator; either the controller or a person monitoring the charted data. An example of a deviation that would be noted by the technician or controller is the vacuum levels illustrated in FIG. 14b, where, as described above, a hole has likely been torn in the sheet.

After wrapping that first sheet, the vacuum is terminated and the first sheet and substrate to which it is adhered are removed from the mold. If the sheet has been deformed, the product is scrapped. Next, a second sheet is placed in the heater for heating. Based on the deviation noted by the operator in the vacuum wrapping of the first sheet, the operator adjusts the amount of heat added to the second sheet, either by altering the heating period or intensity of heat added, to ensure the pressure deviation noted in vacuum wrapping the first sheet is not replicated in vacuum wrapping the second sheet.

After heating the second sheet, the second sheet is transferred to the vacuum mold 150. The rest of the process for wrapping the second sheet is the same as for the first, except that the data acquired and analyzed for the second sheet may be used for controlling the process used to form a third sheet, or multiple other sheets as desired. It will be appreciated that there are multiple hybrids of the real time process and the multiple sheet process. For example, temperature data of a sheet currently being wrapped, a "current shot," may be combined with vacuum data of a sheet previously wrapped, a "previous shot," to adjust the amount of vacuum drawn on the current shot or to adjust the amount of heat added for or vacuum drawn on a subsequent sheet wrapped, or a "subsequent shot." Of course, a plurality of combinations of various data collected from multiple shots are potentially available to control and adjust vacuum and temperature parameters for current and subsequent shots. It will further be appreciated that the above described processes and examples may be used to vacuum form formable material in a similar manner.

Alternative Embodiment

An alternative embodiment of the clamping device 120, as depicted in FIG. 12, includes an independent position sensor 180. The position sensor 180 would measure the rate at which the sheet (not shown) is pulled under the bar 126. A control unit (not shown), in connection with the position sensor 180, would interpret the rate at which the sheet is pulled under the bar 126. In response thereto, the control unit would urge the bar toward or away from the sheet to supply more or less compressive force against the sheet to retard the rate of draw of the sheet or permit the sheet to be drawn more rapidly, depending on the desired application.

In another alternative embodiment, the vacuum pressure sensor of FIG. 5 may be used alone or in combination with the position sensor to similarly control the rate of draw of the sheet against the substrate. The pressure sensor would sense an increase or decrease in vacuum and send this information to a control unit. The control unit would in turn increase or decrease the amount of compressive force exerted on the sheet by the clamping device to retard the rate of draw or permit more rapid draw of the sheet. The position sensor would then feed back the corrected draw rate to the control unit to confirm the rate is proper for the application.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A method of vacuum wrapping comprising the steps of:
   heating a sheet of material;
   measuring the temperature of the sheet;
   positioning the sheet in proximity to a substrate in a mold;
   drawing a vacuum on the sheet to pull the sheet against the substrate; and
   repeating all of said previous steps for a subsequent sheet, and selectively altering said vacuum drawing step in view of prior temperature measurements taken from at least one of the previous sheets.

2. The method of claim 1 further comprising the step of comparing the measured temperature of the sheet to a preferred temperature.

3. The method of claim 2 wherein the vacuum drawn is increased when the measured temperature is less than the preferred temperature.

4. The method of claim 3 wherein the vacuum measured is collected by a processor and output in the form of one from a graphical representation and a statistical representation of the vacuum drawn.

5. The method of claim 4 wherein an operator chosen from a technician and a computer monitors the output and alters a parameter chosen from the heat applied to the sheet, a time period the heat is applied, the vacuum drawn, and a time period the vacuum is drawn in response to one from the graphical and statial representation.

6. The method of claim 5 wherein the computer automatically alters at least one from the parameters.

7. The method of claim 2 wherein the vacuum drawn is decreased when the measured temperature is more than the preferred temperature.

8. The method of claim 2 wherein the vacuum drawn is about 1.8 inches mercury when the preferred temperature is about 340 degrees Fahrenheit.

9. The method of claim 2 wherein the vacuum drawn in said vacuum drawing step is measured and compared to a preferred vacuum and the subsequent sheet is heated more when the measured vacuum is less than the preferred vacuum.

10. The method of claim 2 wherein the subsequent sheet is heated less when the measured vacuum is more than the preferred vacuum.

11. A method of vacuum wrapping comprising:
    heating a sheet of material;
    positioning the sheet in proximity to a substrate in a mold;
    drawing a vacuum on the sheet to pull the sheet against the substrate;
    measuring the vacuum applied to the sheet; and
    repeating all of the previous steps for a subsequent sheet, and selectively altering said heating step in view of prior vacuum measurements taken from at least one of the previous sheets.

12. The process of claim 11 further comprising the step of measuring the temperature of at least one earlier sheet and wherein said adjusting step is further based on said measured temperature.

13. The process of claim 12 further comprising the step of comparing the measured temperature to a set temperature.

14. The process of claim 13 wherein the temperature comparing step is carried out by one from an operator and a processing unit.

15. The process of claim 13 further comprising the step of decreasing a parameter chosen from the level of vacuum, a period of heating time and a period of vacuum draw when the measured temperature is more than the set temperature.

16. The process of claim 13 further comprising the step of increasing a parameter chosen from the level of vacuum, a period of heating time, and a period of vacuum draw when the measured temperature is less than the set temperature.

17. The process of claim 13 further comprising the step of decreasing a parameter chosen from the period of heating time and the period of vacuum draw when the measured vacuum is more than the set vacuum.

18. The process of claim 13 further comprising the step of increasing a parameter chosen from the period of heating time and the period of vacuum draw when the measured vacuum is less than the set vacuum.

19. The process of claim 12 further comprising the step of comparing the measured vacuum to a set vacuum.

20. The process of claim 19 wherein the vacuum comparing step is carried out by one from an operator and a processing unit.

21. The process of claim 19 further comprising the step of increasing the vacuum level when the measured vacuum is less than the set vacuum.

22. The process of claim 19 further comprising the step of decreasing the vacuum level when the measured vacuum is more than the set vacuum.

23. A method for vacuum forming a sheet comprising the steps of:
    heating the sheet;
    placing the sheet in a vacuum mold;
    measuring the temperature of the sheet;
    vacuum drawing the sheet in the mold; and
    adjusting the vacuum drawing step as a function of the temperature of the sheet measured in said measuring step.

24. The process of claim 23 further comprising the step of measuring the vacuum drawn.

25. The process of claim 24 further comprising the step of comparing the measured temperature of the sheet to a preferred temperature.

26. The process of claim 25 further comprising the step of comparing the measured vacuum to a preferred vacuum.

27. The process of claim 26 wherein the vacuum comparing step is carried out by one from an operator and a processing unit.

28. The process of claim 25 wherein the temperature comparing step is carried out by one from an operator and a processing unit.

29. A vacuum forming process comprising the step of:
   positioning a sheet in proximity to a vacuum mold;
   heating the sheet;
   vacuum drawing the sheet in the mold with at least one vacuum level;
   measuring the vacuum drawn on the sheet;
   repeating the proceeding steps; and
   adjusting the heating step as a function of the vacuum measured on at least one previous sheet.

30. The process of claim 29 further comprising the step of comparing the measured vacuum to a set vacuum.

31. The process of claim 30 wherein said vacuum comparing step is carried out by one from an operator and the processing unit.

32. The process of claim 30 further comprising the step of increasing the vacuum level when the measured vacuum level is less than the set vacuum level.

33. The process of claim 30 further comprising the step of decreasing the vacuum level when the measured vacuum level is more than the set vacuum level.

34. The process of claim 29 further comprising the step of measuring the temperature of the sheet, and wherein said drawing step includes adjusting the vacuum level as a function of the temperature of the sheet.

35. The process of claim 34 further comprising the step of comparing the measured temperature to a set temperature.

36. The process of claim 35 wherein said temperature comparing step is carried out by one from an operator and a processing unit.

37. A process for forming a material comprising the steps of:
   providing the material;
   adding an amount of heat to the material for a period of time;
   providing a mold;
   providing a level of vacuum for a period of time to draw the material into conformity with the mold to form the material;
   monitoring at least one of the level of vacuum drawn on the material and the period of time the vacuum is drawn on the material; and
   adjusting at least one of the amount of heat added to the material and the period of time the amount of heat is added to the material wherein said adjusting is a function of said monitoring step.

38. The process of claim 37 further comprising the step of controlling the draw of the material by the vacuum for a period of time with a clamping device.

39. The process of claim 37 further comprising the step of comparing a parameter chosen from the amount of heat added to the material, the period of time the amount of heat is added, the level of vacuum and the period of time the vacuum is drawn to a value chosen from a preferred amount of heat added to the material, a preferred period of time the amount of heat is added, a preferred level of vacuum, and a preferred period of time the vacuum is drawn.

40. The process of claim 39 wherein said comparing step is carried out by at least one from an operator and a processing unit.

41. The process of claim 40 wherein the processing unit displays said comparing step graphically for a human to view and consequently respond to said comparing step by adjusting at least one chosen from the amount of heat added to the material, the period of time the amount of heat is added, the level of vacuum, and the period of time the vacuum is drawn when a circumstance is met during said comparing step, said circumstance chosen from the amount of heat added to the material is not equal to the preferred amount of heat added to the material, the period of time the amount of heat is added is not equal to the preferred amount period of time the heat is added to the material, the level of vacuum is not equal to the preferred level of vacuum, and the period of time the vacuum is drawn is not equal to the preferred period of time the vacuum is drawn.

42. The process of claim 39 further comprising the step of adjusting at least one parameter chosen from the amount of heat added to the material, the period of time the amount of heat is added, the level of vacuum, and the period of time the vacuum is drawn when a circumstance is met during said comparing step, said circumstance chosen from the amount of heat added to the material is not equal to the preferred amount of heat added to the material, the period of time the amount of heat is added is not equal to the preferred amount period of time the heat is added to the material, the level of vacuum is not equal to the preferred level of vacuum, and the period of time the vacuum is drawn is not equal to the preferred period of time the vacuum is drawn.

43. The process of claim 42 wherein said adjusting step is carried out by one from an operator and a processing unit.

44. The process of claim 39 further comprising the step of activating an alarm when a circumstance is met during said comparing step, said circumstance chosen from the amount of heat added to the material is not equal to the preferred amount of heat added to the material, the period of time the amount of heat is added is not equal to the preferred amount period of time the heat is added to the material, the level of vacuum is not equal to the preferred level of vacuum, and the period of time the vacuum is drawn is not equal to the preferred period of time the vacuum is drawn.

45. The process of claim 44 further comprising the step of one from an operator and a processing unit responding to the alarm by adjusting at least one from the amount of heat added to the material, the period of time the amount of heat is added, the level of vacuum, and the period of time the vacuum is drawn.

46. The process of claim 37 comprising monitoring at least one from the amount of heat added to the material and the period of time the heat is added to the material.

47. The process of claim 37 wherein the material is vacuum formed to a substrate to manufacture a vehicle door panel.

48. The process of claim 47 wherein the material is a heat activated adhesive backed fabric.

49. A vacuum wrapping process comprising the steps of:
   heating a sheet;
   measuring the temperature of the sheet;
   positioning the sheet in proximity to a substrate; and
   vacuum drawing the sheet against the substrate; and
   adjusting said vacuum drawing step as a function of the temperature of the sheet measured in said measuring step.

50. A process for vacuum forming a sheet of material comprising the steps of:

positioning the sheet in proximity to a mold; and vacuum drawing the sheet against the mold, said vacuum drawing step including adjusting the vacuum to draw a plurality of levels of vacuum in a staged sequence wherein the staged sequence includes at least one portion where the vacuum drawn is increased, then decreased, then increased.

51. The process of claim 50 further comprising the step of monitoring criterion associated with the sheet and adjusting the vacuum levels in response to the criterion measured.

52. The process of claim 51 wherein the criterion is chosen from the temperature of the sheet, the thickness of the sheet, and the vacuum level drawn.

53. A method for vacuum wrapping a sheet onto a substrate comprising the steps of:

placing the substrate in a vacuum mold;

positioning the sheet in proximity to the substrate;

measuring the temperature of the sheet in the vacuum mold; and vacuum drawing the sheet toward the substrate, said vacuum drawing step including varying the vacuum to draw a plurality of levels of vacuum over time, wherein the plurality of vacuum levels are varied based on the measured temperature of the sheet.

54. The process of claim 53 further comprising the step of monitoring criteria associated with the sheet and varying the vacuum in response to the criteria.

55. The process of claim 54 wherein the criteria is chosen from the temperature of the sheet, the thickness of the sheet, and the vacuum level drawn.

56. A vacuum wrapping process comprising the steps of:

placing a substrate in a vacuum mold;

positioning a fabric in proximity to the substrate;

drawing a first vacuum on the fabric until the fabric is brought into conformity with a portion of the substrate;

measuring the temperature of the fabric;

drawing a second vacuum on the fabric until the fabric is brought into conformity with a remainder of the substrate, said drawing of said second vacuum initiated based on the measured temperature of the fabric; and releasing the substrate and fabric from the mold.

57. The vacuum wrapping process of claim 56 further comprising the step of releasing the fabric to control the movement of the fabric when drawn by at least one of the first and second vacuums.

58. A method of vacuum forming an article from a material comprising the steps of:

providing a formable material;

positioning the formable material in proximity to a mold;

sequentially drawing a plurality of vacuums on the formable material measuring the plurality of vacuums to establish a measured vacuum profile;

comparing the measured vacuum profile to a preferred vacuum profile; and selectively adjusting at least one of the plurality of sequentially drawn vacuums based on said comparing step.

59. The vacuum forming process of claim 58 wherein a first criterion includes bring the formable material into conformity with a portion of the mold.

60. The vacuum forming process of claim 59 wherein a second criterion includes bringing the formable material into conformity with the remainder of the mold.

61. The vacuum forming process of claim 60 further comprising the step of releasing the formable material to control the movement of the formable material toward the mold during said drawing step.

62. A method for vacuum forming a sheet comprising:

heating the sheet;

measuring the temperature of the sheet;

placing the sheet in a vacuum mold;

vacuum drawing the sheet in the vacuum mold;

repeating the proceeding steps; and adjusting the vacuum drawing step as a function of the temperature measured during said temperature measuring step of at least one previous sheet.

63. A vacuum wrapping process comprising:

heating the sheet;

positioning the sheet in proximity to a substrate;

drawing a vacuum to pull the sheet against the substrate;

measuring the vacuum applied to the sheet; and adjusting the heating step as a function of the vacuum measured during said vacuum measuring step.

64. A vacuum wrapping process comprising the steps of:

heating a substrate;

placing the substrate in a vacuum mold;

positioning a fabric in proximity to the substrate;

drawing a first vacuum on the fabric until a first preselected criterion is met;

drawing a second vacuum on the fabric until a second preselected criterion is met;

monitoring a physical characteristic of the fabric; and adjusting at least one of said first vacuum drawing step and said second vacuum drawing step based on said monitoring step.

* * * * *

UNITED STATES PATENT AND TRADEMARK OFFICE
CERTIFICATE OF CORRECTION

PATENT NO. : 6,517,649 B1
DATED : February 11, 2003
INVENTOR(S) : Rugg et al.

It is certified that error appears in the above-identified patent and that said Letters Patent is hereby corrected as shown below:

<u>Title page,</u>
Item [75], delete "Traverse City" and insert -- Newaygo --;

<u>Column 15,</u>
Line 62, delete "statial" and insert -- statistical -- therefor.

Signed and Sealed this

Twenty-ninth Day of July, 2003

JAMES E. ROGAN
*Director of the United States Patent and Trademark Office*